No. 718,153. PATENTED JAN. 13, 1903.
L. R. PHILLIPS.
OSCILLATING WATER MOTOR.
APPLICATION FILED DEC. 12, 1901.
NO MODEL. 2 SHEETS—SHEET 1.
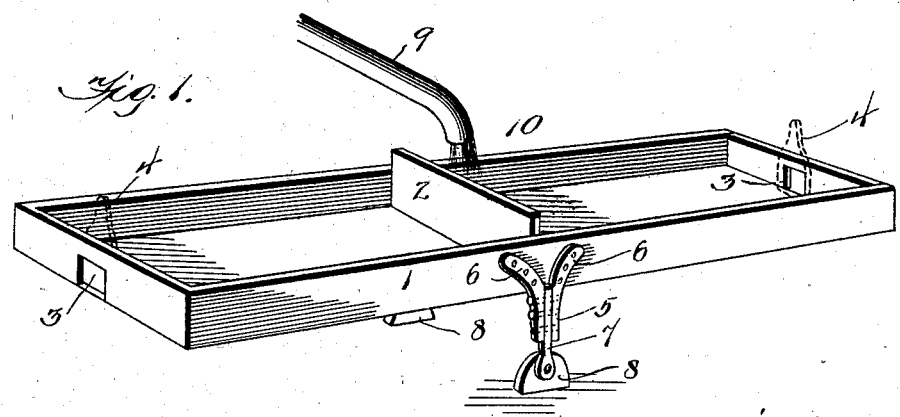
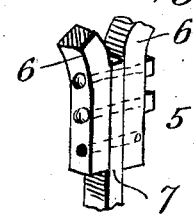
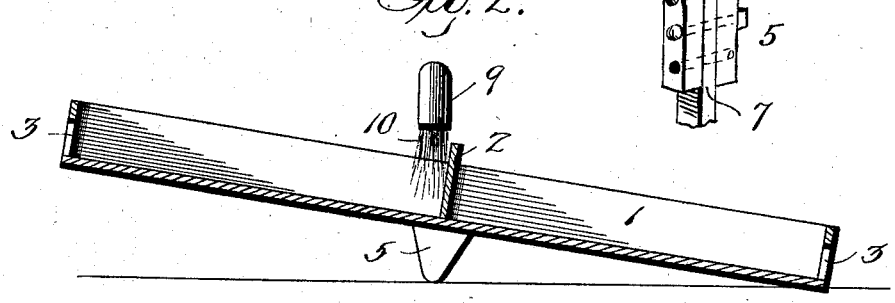
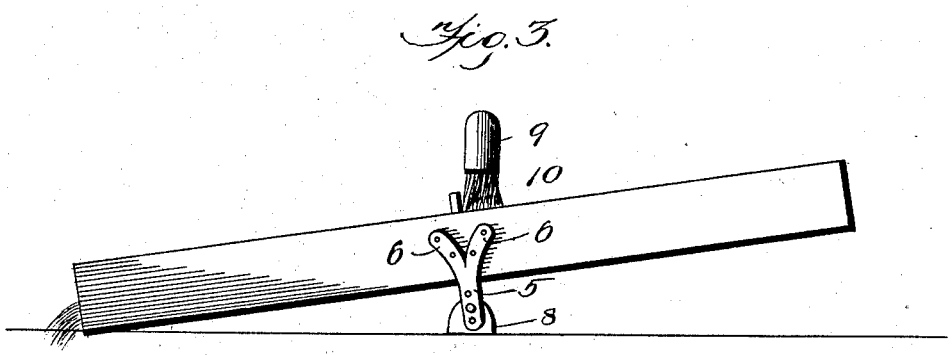

No. 718,153. PATENTED JAN. 13, 1903.
L. R. PHILLIPS.
OSCILLATING WATER MOTOR.
APPLICATION FILED DEC. 12, 1901.
NO MODEL. 2 SHEETS—SHEET 2.
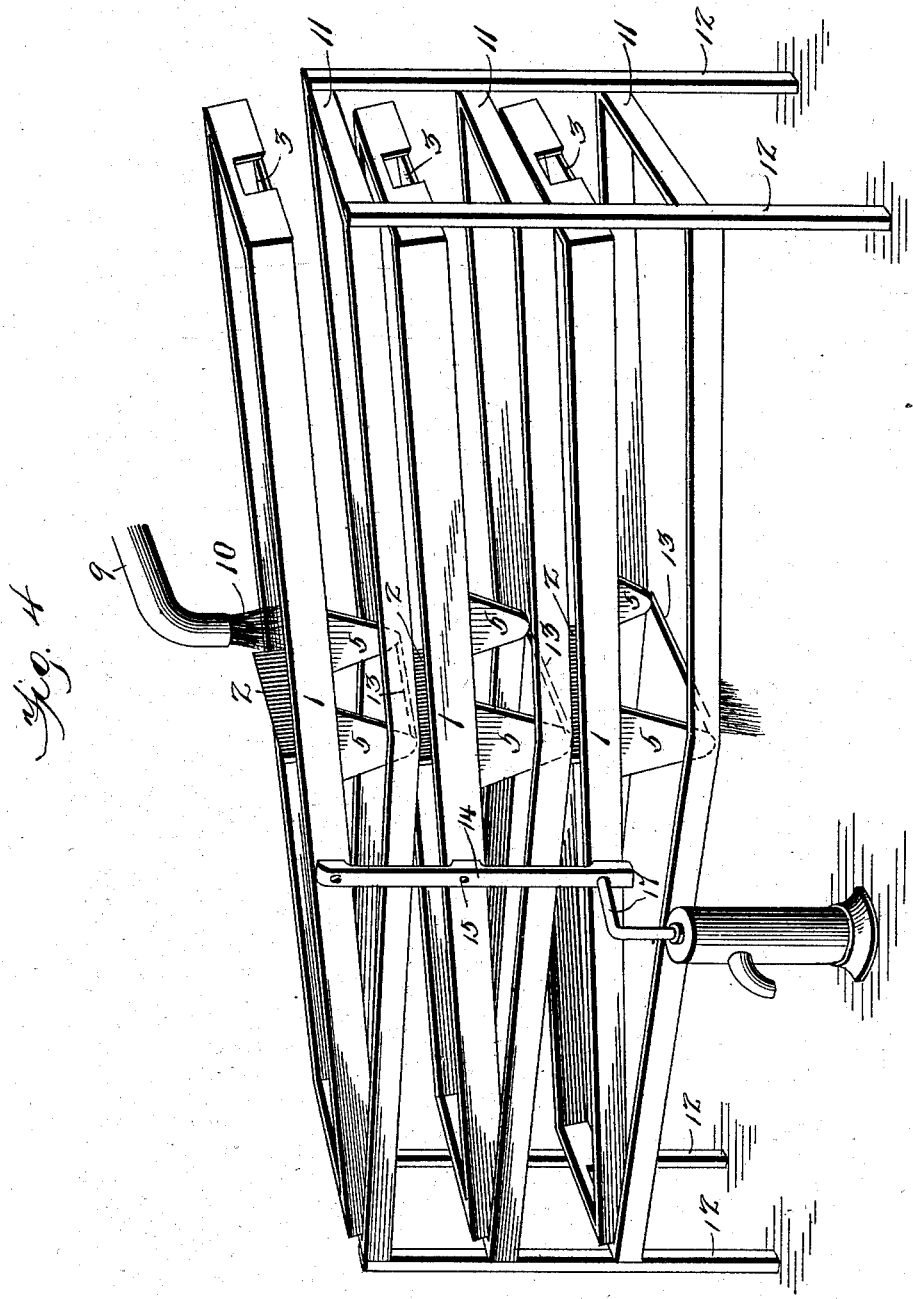

UNITED STATES PATENT OFFICE.

LOREN R. PHILLIPS, OF PALISADES, COLORADO.

OSCILLATING WATER-MOTOR.

SPECIFICATION forming part of Letters Patent No. 718,153, dated January 13, 1903.

Application filed December 12, 1901. Serial No. 85,574. (No model.)

*To all whom it may concern:*

Be it known that I, LOREN R. PHILLIPS, a citizen of the United States, residing at Palisades, in the county of Mesa and State of Colorado, have invented certain new and useful Improvements in Oscillating Water-Motors, of which the following is a specification.

My invention is an "aqua-motor;" and it consists in one or more rectangular oblong boxes having an opening in each end and a series of rectangular troughs supported by legs, said boxes being adapted to be operated one at a time, or two, three, or more simultaneously by a stream of water.

In the center of the boxes and extending above the same is a water-tight partition. Secured to the sides of the boxes and in the center thereof are adjustable legs, extending below the same and adapted to be fulcrumed to bearings.

In the accompanying drawings, Figure 1 is a perspective view of my invention in its simplest form. Fig. 2 is a longitudinal section of Fig. 1, the gates left off and a simple leg shown. Fig. 3 is a side elevation of one of the boxes, the gates not shown. Fig. 4 is a full perspective view of my invention, showing the frame and troughs depressed in the middle and boxes pivoted at their centers and adapted to operate a pump. Fig. 5 is a detail view in perspective showing the legs 5, consisting of part of the arms 6, part of the rods 7, and bolts and nuts securing them together.

My invention is described as follows:

1 represents a long rectangular box, preferably made of wood, having in its center a partition or dividing board 2. Said board is somewhat higher than the side walls of the box. Said box is provided at each end with openings 3 and gates 4. The gates are no part of the operating mechanism of the device, but are simply intended to confine water in the troughs when I wish to wash them out. Extending downwardly from each side of the box and from the center thereof are adjustable legs 5. These adjustable legs consist of two arms 6, their upper ends curved to the right and to the left and are firmly secured to the sides of the box, their lower ends extending downwardly, and between these lower ends are adjustably secured, by means of bolts and nuts, rods 7, the lower ends of which are perforated and adapted to be hinged to fulcrums 8.

A spout 9 runs from the stream and empties its water 10 in the box 1 on the right-hand side of the division-board, and when that side gets considerable water in it it tips down and throws the division-board to the right of the spout 9, and the water flows out of the opening 3, and when the other end of the box is filled then it tips down and the water flows out of the opening 3 in that end of the box and the right-hand end of the box tips up, (see Figs. 1, 2, and 3,) and thus one end of the box goes up while the other goes down and then the other goes up while the first end goes down, and so on, thus giving motion and power, and this motion can be converted into any kind of motion—vertical, horizontal, reciprocal, or circular—and may run any kind of machinery, provided the same is within the power of my invention.

It is not deemed always necessary that the legs 5 be adjustable. Mere feet may be used, as shown in Fig. 2, or a simpler form of adjustable legs may be used, as shown in Fig. 3. In this latter case the upper end of the legs may be bifurcated and one end turned slightly to the right and the other to the left and secured to the sides of the boxes, and their lower ends may be provided with three or more perforations and adapted to be hinged to the bearing 8 by either the lower, upper, or intermediate perforations.

The principal purpose of having the feet 5 adjustable is to give more or less tip and power to the boxes. It is apparent that if the legs are short the depth of the water 10 in the boxes cannot be so great as where the legs are long and the extent of the tip will be much shorter; but where the legs are long the tip will be greater and the water deeper in the boxes, and thus much more leverage and power will be given with the tip of the box or of the boxes when more than one is used.

It will be observed that the object of this invention is chiefly to utilize small mountain streams; but it may be used anywhere where the fall is sufficient.

Referring to Fig. 4, 11 represents three rectangular troughs depressed at their centers. These troughs are secured in four vertical legs 12, and have each in their centers openings 13 for the water to pass through, so that the water that passes from the pipe 9 eventually passes through and is discharged from the lower trough. Resting on legs 5 and in the depressed parts of these troughs 11 are the operating-boxes 1, connected by a pitman 14. The water is discharged through the pipe 9 into the right-hand end of the upper box 1, and as soon as that end is sufficiently heavy it tips downwardly and the water is discharged through the opening 3 into the upper depressed trough 11 and runs immediately to the center and is discharged through the opening 13 into the lower boxes and troughs successively, the partitions 2 being placed after each movement so as to direct the water upon the same sides of all the boxes, and is discharged therefrom through opening 13 of the lower trough. This operation gives motion to the pitman 14 and throws the left-hand ends of the boxes up and the division-boards 2 to the right of the spout 9, and then the water flows into the left-hand ends of the upper box and down through the other boxes and troughs, as above described. Thus the power is much augmented. These boxes 1 must necessarily operate together, because they are united by a pitman 14, which is pivoted to each one. The lower pivot-bolt 17 of said pitman extends outwardly and then turns downwardly at an angle of about ninety degrees and is adapted to be connected to and operate a pump.

Having described my invention, what I claim as new, and desire to secure by Letters Patent, is—

1. The combination with a rectangular oblong box having openings in each end, and having a division-board midway between its ends higher than its walls, and having arms secured to its middle portion, of rods between said arms; bolts and nuts whereby said arms are adjustably secured, and fulcrum-blocks to which said rods are pivoted at their lower ends with means for supplying water to the same, substantially as shown and described and for the purposes set forth.

2. Rectangular oblong troughs depressed in their centers, and having an opening in their centers for the discharge of water; legs secured, one to each corner of said rectangular oblong troughs, holding the same horizontally one above the other, and some distance apart; rectangular oblong boxes provided with openings in each end, and each with a center board taller than the walls of said boxes; said boxes provided in their centers with feet; a pitman pivoted to the said boxes some distance from their feet; said boxes adapted to be tipped, one end down and the other end up, and then the other end down, and the other end up, and thus giving motion and power with means for supplying water to the same, substantially as shown and described and for the purposes set forth.

3. Rectangular oblong troughs depressed in their centers, and having each an opening in its center for the discharge of water; legs secured one to each corner of said rectangular oblong troughs, holding the same horizontally one above the other, and some distance apart; rectangular oblong boxes each provided with an opening in each end, and each with a center board taller than the walls of said boxes; said boxes provided in their centers with feet, and pivoted in the center of said rectangular oblong troughs; a pitman pivoted to said boxes some distance from their feet, the lower pivot-bolt extending outwardly and then downwardly, and adapted to be connected to and operate a pump with means for supplying water to the same, substantially as shown and described and for the purposes set forth.

In testimony whereof I affix my signature in presence of two witnesses.

LOREN R. PHILLIPS.

Witnesses:
J. A. POST,
C. S. REED.